Dec. 23, 1941.   L. C. RONEY   2,267,221
DEVICE FOR GAUGING LIQUEFIED GAS TANKS
Filed Oct. 18, 1940
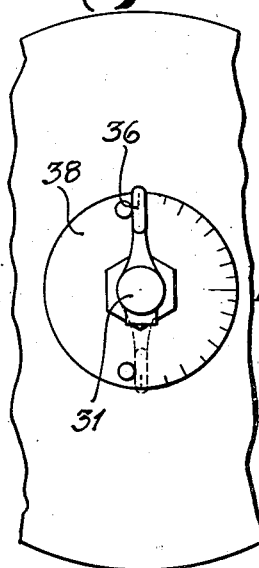
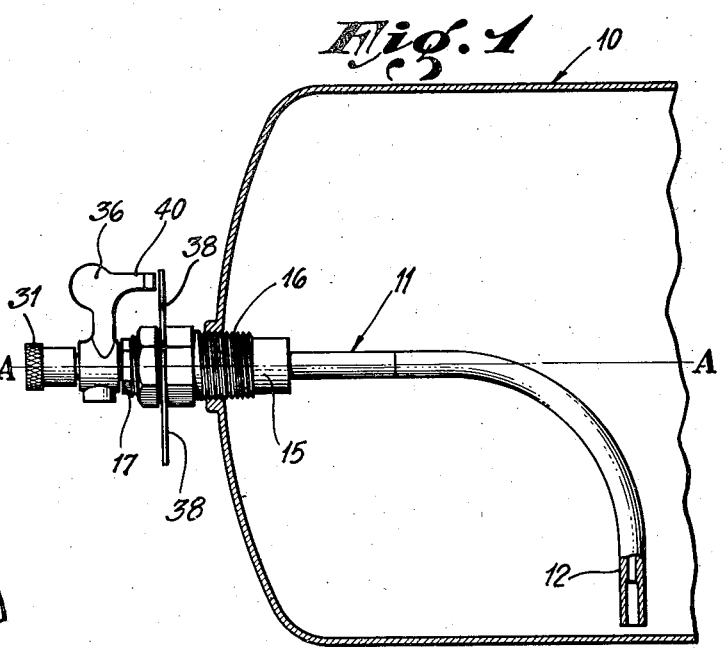
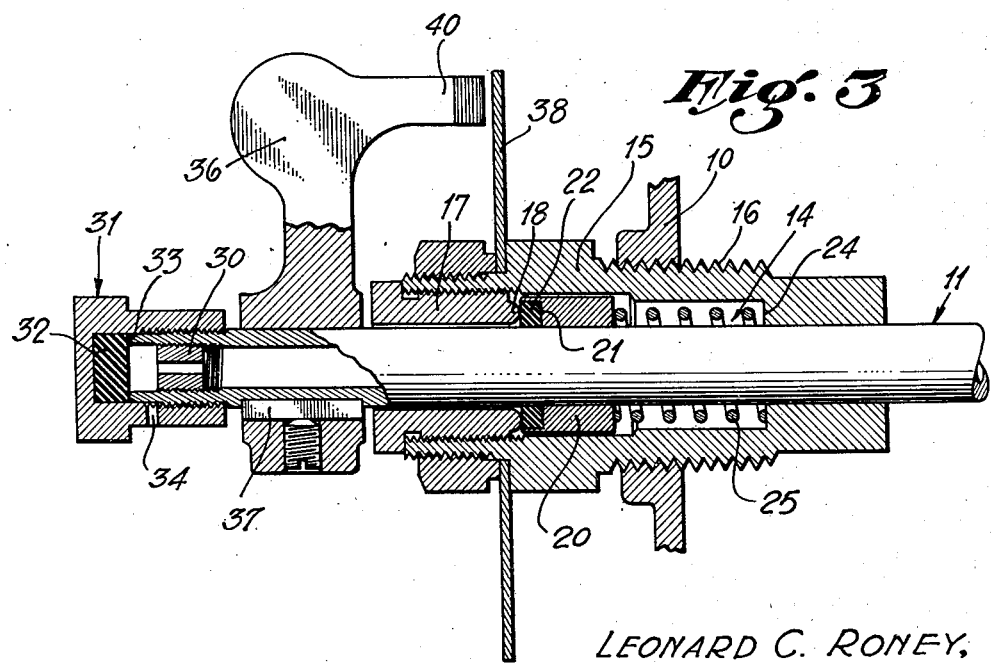
LEONARD C. RONEY,
INVENTOR;
ATTORNEY.

Patented Dec. 23, 1941

2,267,221

UNITED STATES PATENT OFFICE 2,267,221

DEVICE FOR GAUGING LIQUEFIED GAS TANKS

Leonard C. Roney, Los Angeles, Calif., assignor to L. C. Roney, Inc., Los Angeles, Calif., a corporation of California Application October 18, 1940, Serial No. 361,743

1 Claim. (Cl. 73—298)

My invention relates to gauges for gauging the liquid level in containers filled with liquefied gas; and it relates particularly to a rotary gauging device having a readily rotatable gauging tube which is protected from leakage by a unique sealing means.

It is an object of my invention to provide a gauging device of the character referred to above in which the gauging tube which extends into the container through an opening in the wall thereof is provided with a sealing member which is secured to the gauging tube and which is held in engagement with a seat by means of a compression spring. The sealing member and the seat comprise a sealing means which surrounds the gauging tube and effectively prevents leakage of fluid from the container. One of the advantages of my invention is that the pressure within the container cooperates with the spring in holding the two parts of the sealing means in sealing tight engagement.

Other objects and advantages of my invention reside in the details of construction of the preferred form of my invention which I will hereinafter describe and which are shown in the accompanying drawing. These further objects and advantages will be brought out during the course of the following description.

Referring to the drawing:

Fig. 1 is a fragmentary sectional view through a container having applied to it a gauging means of my invention.

Fig. 2 is a fragmentary end view of the container for gauging means of my invention.

Fig. 3 is a fragmentary sectional view showing the details of construction of my invention and particularly showing the unique sealing means which I have devised.

Referring to the drawing in detail, the numeral 10 represents a container adapted to contain a liquid under pressure which may be a liquefied gas, such, for example, as butane. The pressure of the fluid within the container does not indicate the amount of liquefied gas in the container and this must be determined either by weighing the container and its contents or gauging the liquid level by a means such as the gauging device which I have provided.

The gauging device of my invention includes a rotatable gauging tube 11 which extends into the container 10 and has the inner end 12 thereof extended radially outward from the axis of rotation A—A of the tube. The tube 11 extends through an opening 14 provided by a body 15 which is preferably removably secured to a wall of the container 10 such as by means of the threaded portion 16. The body 15 supports a seat member 17 in the outer end of the opening 14, in any suitable manner such as by the threads shown. The inner end of the seat member 17 is provided with an annular seat 18 of semi-cylindrical cross-section, as shown in Fig. 3. Surrounding the tube 11 at a place within the opening 14 and adjacent the inner end of the seat member 17 is a sealing member or collar 20 which forms a part of the sealing means of my invention. This collar 20 preferably is sweated on to the tube 11 so that no fluid can leak outwardly between the collar and the tube. The outer end of the collar 20 is provided with an annular recess 21 in which there is placed a sealing ring 22 which faces outwardly toward the seat 18. Compressed between the inner end of the collar 20 and the shoulder 24 provided within the opening 14 is a compression spring 25 which is effective in forcing the tube and collar outwardly so that the sealing ring 22 is brought into engagement with the seat 18. In addition to the force of the spring tending to hold the sealing members in sealing tight engagement, there is also the pressure exerted by the fluid within the container. It will be seen that the fluid in the container will force outwardly against the collar and in cooperation with the spring will hold the sealing ring 22 against the seat 18. One important advantage of this arrangement is that if the pressure within the container is relatively high there would be a correspondingly high pressural engagement of the sealing ring against the seat. As the pressure within the container decreases and the need for high pressural engagement between the sealing ring and the seat diminishes, then the pressure exerted against the collar by the fluid within the container will also decrease. By this arrangement, therefore, there is always a pressural engagement of the sealing member and the seat. This is produced by the spring 25. In addition to this, there is a force tending to hold the sealing parts in engagement depending upon the pressure which exists within the container.

Secured in the outer end of the tube 11 is an orifice plug 30 and threadedly supported on the outer end of the tube 11 is a valve cap 31 having a valve member 32 adapted to engage a valve seat 33 formed on the end of the tube. Formed in the side wall of the cap 31 is an outlet 34 through which the fluid may pass when the valve 32 is disengaged from the seat 33.

Secured on the part of the tube which rests outside the body 15 is a handle 36 whereby the tube 11 may be rotated. This handle is held in a predetermined position with respect to the tube by means of a key 37. Supported on the outer part of the body 15 is a gauge disc or dial 38 having indicating marks formed thereon which, in cooperation with a finger 40 which extends from the handle 36, will indicate the liquid level within the container 10 or indicate the amount of liquid within the container.

In using the invention the valve cap 31 is rotated on the end of the tube so as to open the valve. This will allow fluid to pass outwardly through the rotatable tube 11. The operator then by means of the handle 36 will rotate the tube until he determines the level of the liquid. This may be done as follows: If in starting the operation the end 12 of the tube is in an upper position gas will flow outward through the tube 11. As the tube is rotated the end 12 will move downward and when the end of the tube reaches a point at which liquid enters the tube liquid will then flow through the tube and outward through the outlet 34. At this time the operator will look at the indication to which the finger 40 points and he will thus be informed of the contents of the cylinder.

The gauging device of my invention is accurate in its indications and is simple to operate. The unique sealing device which I have incorporated as a part of my invention eliminates the use of the ordinary packing which is unsatisfactory because it requires frequent attention and replacement. In my invention there need be no concern about leakage because of the fact that the spring 25, in conjunction with the fluid pressure within the container assures a sealing engagement between the sealing ring 22 and the seat 18.

From the foregoing the various features and advantages of my invention will be readily understood. Various modifications and alterations may be made without departing from the spirit and scope of my invention as defined in the appended claim.

I claim as my invention:

In a gauging device for gauging the liquid level in a container having a liquefied gas therein, the combination including: a body adapted to be supported by the container, said body providing an opening through the wall of said container; a rotatable gauging tube extending through said opening and into said container; a seat member supported by said body and surrounding said tube, said seat member having an inwardly facing seat; a collar surrounding and secured to said tube at a place within said opening of said body; a sealing ring carried at the end of said collar near said seat; a spring compressed within said opening for urging said collar and tube outwardly so that said sealing ring engages said seat to form a seal around said tube; means for indicating the rotative position of said tube; and valve means for controlling the flow of fluid through said tube.

LEONARD C. RONEY.